United States Patent
Kassow

(10) Patent No.: US 11,850,736 B2
(45) Date of Patent: *Dec. 26, 2023

(54) JOINT ASSEMBLY

(71) Applicant: Kassow Robots ApS, Kastrup (DK)

(72) Inventor: Kristian Kassow, Copenhagen (DK)

(73) Assignee: Kassow Robots ApS, Kastrup (DK)

( * ) Notice: Subject to any disclaimer, the term of this patent is extended or adjusted under 35 U.S.C. 154(b) by 256 days.

This patent is subject to a terminal disclaimer.

(21) Appl. No.: 17/148,728

(22) Filed: Jan. 14, 2021

(65) Prior Publication Data

US 2021/0138667 A1    May 13, 2021

Related U.S. Application Data

(63) Continuation of application No. 15/746,064, filed as application No. PCT/DK2016/050255 on Jul. 21, 2016, now Pat. No. 10,919,159.

(30) Foreign Application Priority Data

Jul. 21, 2015    (DK) .......................... PA 2015 70484

(51) Int. Cl.
*B25J 17/02* (2006.01)
*B25J 9/08* (2006.01)
(Continued)

(52) U.S. Cl.
CPC ............... *B25J 17/025* (2013.01); *B25J 9/08* (2013.01); *B25J 9/1025* (2013.01); *B25J 9/126* (2013.01);
(Continued)

(58) Field of Classification Search
CPC .... B25J 9/1025; B25J 17/0241; B25J 17/025; B25J 9/126; F16H 49/001
See application file for complete search history.

(56) References Cited

U.S. PATENT DOCUMENTS 3,883,900 A  *  5/1975  Jerard ....................... A61F 2/72
                                                        623/60
4,398,110 A     8/1983  Flinchbaugh et al.
(Continued)

FOREIGN PATENT DOCUMENTS

GB    2505226 A  *  2/2014  ............... G01D 5/12
GB    2505226 A     2/2014
(Continued)

OTHER PUBLICATIONS

Office Action dated Oct. 2, 2020 issued in European Application No. 16745048.5 (8 pages).
(Continued)

*Primary Examiner* — Gregory Robert Weber
(74) *Attorney, Agent, or Firm* — Nixon & Vanderhye P.C.

(57) ABSTRACT

A joint assembly for a robot, comprising a housing connected with an output part. The housing comprising a housing wall and a strain wave gearing system. The strain wave gearing system comprising a wave generator, a flexspline, and a circular spline connected to the output part. The wave generator is rotated by a rotor shaft. The rotor shaft is driven by an electric motor comprising a rotor magnet and a stator. The rotor magnet being affixed to the rotor shaft. The joint assembly further comprises one or more sensors comprising one or more magnetic field sensors and one or more pole rings arranged to measure a position of the output part in relation to the housing.

24 Claims, 15 Drawing Sheets

(51) Int. Cl.
    *B25J 9/10*           (2006.01)
    *B25J 9/12*           (2006.01)
    *B25J 19/00*         (2006.01)
    *B25J 19/02*         (2006.01)
    *F16H 49/00*        (2006.01)

(52) U.S. Cl.
    CPC ....... B25J 17/0241 (2013.01); B25J 19/0004 (2013.01); B25J 19/02 (2013.01); F16H 49/001 (2013.01); *Y10S 901/15* (2013.01); *Y10S 901/23* (2013.01); *Y10S 901/25* (2013.01); *Y10S 901/29* (2013.01); *Y10S 901/46* (2013.01)

(56) References Cited

U.S. PATENT DOCUMENTS

| | | | | |
|---|---|---|---|---|
| 4,678,952 A * | 7/1987 | Peterson | ............. | B25J 19/0029 |
| | | | | 901/29 |
| 5,222,409 A * | 6/1993 | Dalakian | ................ | B25J 9/1065 |
| | | | | 414/733 |
| 5,355,063 A * | 10/1994 | Boone | ..................... | B25J 9/1025 |
| | | | | 318/605 |
| 5,971,091 A | 10/1999 | Kamen et al. | | |
| 7,891,272 B2 * | 2/2011 | Schonlau | ................ | B25J 9/1025 |
| | | | | 74/640 |
| 8,058,757 B2 * | 11/2011 | Himmelmann | ......... | F16D 49/16 |
| | | | | 188/164 |
| 8,400,096 B2 * | 3/2013 | Miyashita | .......... | G01D 5/24476 |
| | | | | 318/602 |
| 9,104,650 B2 * | 8/2015 | Hosek | ................ | G05B 23/0283 |
| 10,309,801 B2 * | 6/2019 | Schott | ..................... | G01D 5/145 |
| 2012/0210816 A1 * | 8/2012 | Izumi | ..................... | B25J 9/1641 |
| | | | | 310/68 B |
| 2013/0020900 A1 | 1/2013 | Takeuchi | | |
| 2014/0084840 A1 | 3/2014 | Osaka | | |
| 2017/0184190 A1 * | 6/2017 | Klassen | ................ | F16H 49/001 |
| 2018/0215050 A1 | 8/2018 | Kassow | | |

FOREIGN PATENT DOCUMENTS

| | | |
|---|---|---|
| WO | 2007/082954 A1 | 7/2007 |
| WO | WO 2011/127410 | 10/2011 |
| WO | WO 2013/138912 | 9/2013 |

OTHER PUBLICATIONS

International Search Repot and Written Opinion of the ISA for PCT/DK2016/050255, dated Nov. 8, 2016, 15 pages.

* cited by examiner

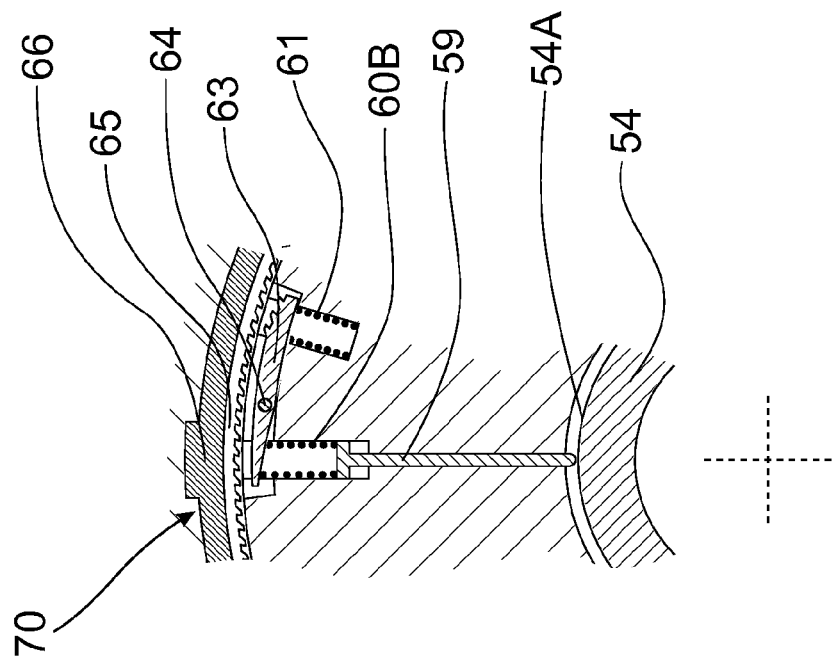
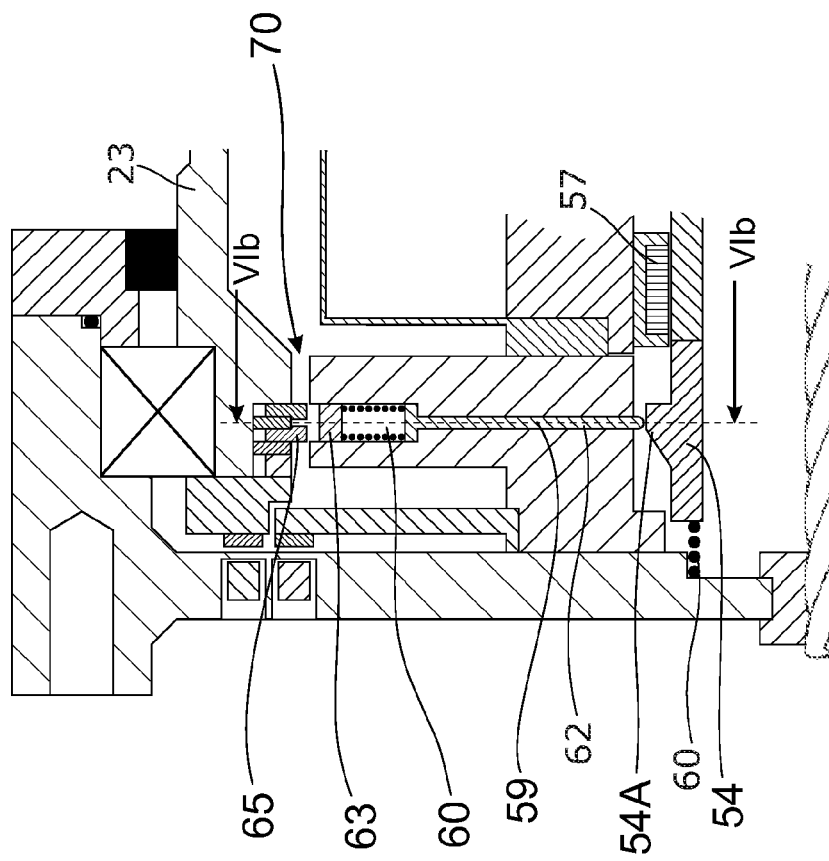
Fig. 6B
Fig. 6A

JOINT ASSEMBLY

This application is a continuation of U.S. application Ser. No. 15/746,064, filed Mar. 1, 2018, now pending, which is the U.S. national phase of International Application No. PCT/DK2016/050255 filed 21 Jul. 2016, which designated the U.S. and claims priority to DK Patent Application No. PA 2015 70484 filed 21 Jul. 2015, the entire contents of each of which are hereby incorporated by reference.

FIELD OF THE INVENTION

The present invention relates to a joint assembly for a robot, to a robotic arm comprising a joint assembly according to the present invention and to the use of the joint assembly according to the present invention.

BACKGROUND ART

Joint assemblies are widely used in the robotic industry. Along with the extended use of robots in an increased number of situations, the requirements for the joint assemblies have changed. The joint assembly needs only to be configured in two variations, rotational joint assemblies and bending joint assemblies, in order to configure a robotic arm having six axes and hence being capable of being set to all frequently required positions.

Today, it is commonly known to build robots from modular robot joint assemblies having a built-in electric circuit board in order to drive an electric motor. The electric motor may for instance comprise a stator and rotor/shaft with permanent magnets that drive a wave gear/harmonic drive gear. The wave gear/harmonic drive gear consists of a flexspline, a ring gear, a wave generator bearing and a wave generator. All bearings are often integrated in the joint, both the bearings intended for positioning the rotor correctly in the housing and the bearings intended for positioning the output part in relation to the housing. In this way, one end is coupled directly to the input side of the structure, while the other end is coupled directly to the output side of the structure. These joint units often have an aperture along the longitudinal axis, through which cables may extend, enabling successive connection of multiple joints.

In order to achieve a higher speed of movement, faster acceleration combined with higher precision, the total dynamic forces acting on the joint and the robot are increased.

Hence, it has been desirable to obtain a compact joint design in order to minimise the dynamic forces acting on the robotic system as a whole.

The larger the load on the moving end of a robotic arm, the higher the forces acting on the system will be. In particular, if the robot is a robot working in close relation with humans, it is important to be able to predict and control the dynamic forces acting on the system. For instance, a robot configured to carry a load of e.g. 10 kilograms may in an unfortunate incident kill a worker standing nearby by dropping the load from a distance of only 1 metre. The closer the robots work together with humans, the more reliable the security system preventing accidents with the robot needs to be. Furthermore, the faster the robots are working, the faster the response to a critical failure needs to be.

SUMMARY OF THE INVENTION

It is an object of the present invention to wholly or partly overcome the above disadvantages and drawbacks of the prior art. More specifically, it is an object to provide an improved joint assembly.

It is a further object of the present invention to provide a joint assembly that minimises the risk of hazardous situations for the workers near the joint assembly.

The above objects, together with numerous other objects, advantages and features, which will become evident from the below description, are accomplished by a solution in accordance with the present invention by a joint assembly for a robot, comprising:
- a housing connected with an output part, the housing comprising a housing wall,
- a strain wave gearing system comprising:
  - a wave generator,
  - a flexspline, and
  - a circular spline connected to the output part, wherein the wave generator is rotated by a rotor shaft, the rotor shaft being driven by an electric motor comprising a stator and a rotor magnet, the rotor magnet being affixed to the rotor shaft, and wherein the joint assembly further comprises:
- a rotor brake configured to stop/prevent relative movement between the rotor shaft and the flexspline, and
- sensors arranged to measure the position of the rotor shaft in relation to the output part.

In this way, a compact, light and reliable joint assembly is obtained. In order to minimise the dynamic forces acting on the joint, the joint should be as compact as possible. If the joint is a part of a robotic arm, the dynamic forces acting during stop and start and when loading and unloading a load carried by the arm may have significant influence on the capabilities of the whole robot system. Typically, a robotic arm handling a load close to the fixation point of the arm has greater accuracy than when the same arm handles the same load a large distance from the arm. Obviously, manufacturers of robotic systems ensure that the arm is capable of delivering the desired precision at the desired distances from the point of fixation. However, the less dynamic effect the arm itself introduces to the system, the more the system depends exclusively on the necessary load properties. The torque subjected to a robotic arm is defined by the arm (length) times the force subjected to the arm. Hence, the nearer the load is to the fixation point of the arm, the smaller the torque is. Similarly, the resulting torque is reduced if the arm is made shorter. Considering the final precision in view of the dynamic loads of a robotic arm, an increase in either weight or length of the arm influences the precision of the tip of the arm in a negative direction, i.e. lower total precision of the arm.

Another purpose of this arrangement is that the flexspline, being made of a ferromagnetic steel, shields the magnetic field of the motor so it does not disturb the sensors on the electronics nearby. Since the flexspline is allowed to be quite long because it envelopes the motor, the flexspline is also allowed to be a bit thicker, still having the same flexibility to ovalisation near the wave generator, strengthening it further. In another embodiment, the joint assembly may compromise a planetary gear between the rotor shaft and the wave generator, hence allowing the stator and the roto magnet to be smaller while providing the same output power, even at a higher speed, and thereby reducing the inertia that the wave generator reflects on the rotor shaft.

The joint assembly may further comprise a wave generator arranged to flex the flexspline.

Also, the flexspline may comprise a base spline part, a cup wall part and a toothed wall part.

Moreover, the joint assembly may comprise a motor housing configured to position the stator in relation to the rotor magnet. The motor housing may be rotated along with the flexspline. In this way, it is ensured that the stator only rotates at a very low speed in relation to the rotor magnet.

Further, the joint assembly may comprise a power supply.

In addition, the joint assembly may comprise a control circuit for controlling the operations of the joint, e.g. rotation of the motor and activation of the brake.

The construction of the joint assembly facilitates that a greasy section of the joint, containing the motor and the wave generator bearing, may be kept in a particular space fully separated from the rest. In this way, a dirty space is separated from a clean space. Hence, the provision of a clean space makes it possible to use dirt-sensitive components and still arrange them inside the joint.

The joint assembly may comprise a seal between the housing and the output part. The joint assembly may comprise a seal between the housing and the output housing. Such construction of the joint assembly, necessitating only one dynamic seal, minimises the generation of heat during rotation. The dynamic seal seals between two elements moving in relation to each other.

Furthermore, the rotor brake may comprise a friction clutch for minimising the impact on the joint when the rotor brake brakes.

Also, the rotor brake may comprise a brake ring.

In this way, it is possible to brake and lock the rotor shaft in a desired position.

The rotor brake may be spring-loaded. In this way, it is still possible to activate the brake even if the power to the joint assembly is lost.

Furthermore, the brake spring may be made from a non-ferromagnetic material.

The rotor brake ring may comprise a non-ferromagnetic pusher part.

Moreover, the rotor brake may comprise an anti-rotation ring. The anti-rotation ring may be a friction ring. In this way, it is possible to brake the rotor in a controlled manner by allowing a minor rotation when braking. The brake torque, i.e. the degrees of rotation, may be adjusted by adjusting the friction between the anti-rotation ring and the brake ring.

The braking of the rotor shaft may be activated by one or more springs acting on the anti-rotation ring.

Further, the rotor brake may comprise a timing ring. The timing ring ensures that the activation of the rotor brake is activated in an angular position that facilitates full engagement of the rotor brake ring with a stud on the rotor shaft. In this way, it is possible to time the activation of the rotor brake ring with a minimal risk of damaging the brake and/or the joint assembly.

The joint assembly according to the present invention may comprise an output brake configured to stop/prevent rotation of the output part.

In this way, it is possible to stop rotation of the output part, e.g. a part of a robotic arm, although the flexspline is broken. Due to the construction of the strain wave gearing system, the output part is in fact free to rotate if the flexspline is fully broken, i.e. the wall of the cup is torn apart. In the case that the robotic arm only carries small loads, this may be a source of irritation or inconvenience. However, in the case where the robotic arm carries large loads, e.g. 5 or 10 kilos or more, such free rotation may be highly hazardous for the operator. Hence, it is necessary to minimise the risk of free rotation in case of failure of the flexspline. Similarly, if the power to the robotic arm is lost, the brake may be configured so that it automatically ensures that no rotation is possible.

In one embodiment, the output brake may be spring-loaded.

Furthermore, the output brake may be activated by an electro-magnetic release system. In this way, it is possible to activate the output brake by an electric signal. The signal may be so arranged that in case the power to the system is cut off, the brake will be activated automatically.

Also, the output brake may be activated by a solenoid.

The output brake may, in its engaged position, prevent relative movement between the rotor shaft and the output part.

Further, the output brake may be activated substantially simultaneously with a rotor brake. The output brake may be activated slightly later than the rotor brake. When the rotor brake is activated, it is possible to measure whether the use of the rotor brake also results in braking of the output part. If no braking is detected, there is a risk that the flexspline is broken, and the output brake needs to be activated. The forces acting on the system when the output brake is activated are significant, and hence braking using the output brake is preferably avoided. The output brake and the rotor brake may be activated according to the torque subjected to the flexspline. In order to ensure that the flexspline is not damaged, while still obtaining a fast and reliable braking, the output brake and the rotor brake may act simultaneously, even if the flexspline is intact. Due to a fast and reliable braking of e.g. a robotic arm, a robot may interact closer and faster with humans.

The output brake may comprise a spring. In the engaged position of the brake, i.e. in the braked position, the spring may be in a relaxed position. The output brake may comprise a lever mechanism having a pivot point, e.g. a brake lever. The output brake may comprise an engagement part that engages the output part by a key and a slot. The output brake may comprise an engagement part that engages the output part by a ratchet mechanism.

Moreover, the output brake may comprise an activation pin for activation of the brake. In this way, it is possible to control the output brake from a point located remote from the output part.

The output brake may be a mechanical brake in which two parts interlock with each other.

Furthermore, the output brake may be triggered by a movement of a trigger part that triggers a pusher, moving along the longitudinal axis of the joint assembly to activate a brake engagement perpendicular to the longitudinal axis.

The joint assembly according to the present invention may further comprise a sensor for sensing the rotation of the rotor shaft, wherein the sensor is arranged in the housing wall.

In one embodiment, the housing in the joint assembly may comprise a number of blind holes.

In this way, it is possible to mount sensors directly in the housing. The blind holes may be equidistantly arranged substantially along a circular outline.

These blind holes may be configured such that the blind end of the hole is facing the output part. In this way, it is possible to separate the space comprising the flexspline and the motor from the sensor(s).

The sensor may be positioned in the housing in a space different from that of the flexspline.

In this way, it is possible to arrange the sensors outside the housing. Hence, problems concerning dirt and grease are avoided. Furthermore, it is possible to shield the sensors from disturbing signals from the motor. The placement of the motor, i.e. rotor magnet and stator, inside the flexspline further shields the surrounding from electromagnetic disturbance.

The housing or housing wall may be made of aluminium, a polymer or other non-ferrous materials or composites. In this way, it is possible to use magnetic field sensing from one side of the housing wall to the other side of the housing wall. Hence, the magnetic field sensor may be positioned on the one side of the housing and a pole ring on the other side.

The pole ring may comprise 10-500, 20-400 or 30-300 poles on a 50 mm pole ring. In this way, it is possible to get at high resolution in the positioning. A sensor may detect several positions within one pair of poles.

Moreover, the magnetic field sensor may be arranged on the one side of the housing wall and the pole ring on the other side of the housing wall.

Furthermore, the joint assembly may comprise a position sensor. The position sensor uses a 360 degree Vernier Principle. The sensor may be a magnetic field sensor.

The joint assembly may comprise an output house connecting the output part and the housing. The housing, the rotor shaft, the output house and the output may define a joint space. The flexspline may be fully contained in the joint space.

Also, the joint may comprise an absolute encoder, the absolute encoder comprising two magnetic field sensors and two pole rings. The joint may comprise a plurality of sensors and pole rings, such as three or more. The absolute encoder may be an incremental encoder. The absolute encoder may generate the position of the output part from a rotor joint sensor and the gear ratio to the output part. However, in this way, it is achieved that less pole rings are necessary compared to traditional absolute encoding in robotic joint assemblies. In particular, in this way, the use of a rotor encoder serves not only to encode the overall position of the rotor, but also to use the combination of the information from the rotor encoder and the shaft. In this way, the pairs of sensor and pole ring serve both an individual task in encoding and a combined task. In this way, the need for calculating the position of the rotor by a Vernier principle is minimised, and hence, important reaction time is saved.

Further, the joint output position sensor may comprise two or more pole rings, the two rings having a different number of pole pairs. The joint output position sensor system may comprise two or more sensors.

One pole ring may be arranged on a torsion flexible member. The torsional flexible member may be connected to the output part. In this way, it may be measured by the pole ring that a torque is applied to the output part in relation to the rotor sensor or rotor shaft. The flexible member comprising a pole ring may be capable of relating to the sensor in a manner that allows for +/−10% in either direction when subjected to a load. However, the resolution of the measuring of the flexibility of the torsion flexible member needs to be high, e.g. 0.01°-2°, or more preferred 0.1°-1°. In this way, it is possible to relate a non-flexibly mounted pole ring to the flexibly mounted pole ring and measure the difference between the two.

The one sensor may have a pole ring where a full rotation is divided into three sections, i.e. 120° each. If the gearing is 1:100, the 120° will not be in the same position for each rotation because 100 cannot be divided by 3 and is thereby not an integer. In this way, it is possible to first subdivide the 360° into three sections and then further subdivide the 3 by a second set of pole rings. Hence, the second set of pole rings may have a lower resolution, i.e. a lower number of magnets, and still, in combination the resolution is sufficient. If an equally high resolution were to be obtained with a single pole ring (and sensor), the risk of misreadings would be high because a very high number of poles would be necessary.

The higher the number of poles (magnets), the higher the risk of the sensor being positioned between two poles, thereby making it difficult to get a precise reading. This in combination with a further pole ring split into a number of positions provides for an accurate positioning.

The housing may comprise flexible members.

In this way, it is possible for the perimeter part of the housing to be rotated in relation to an inner part of the housing. Hence, when the outer perimeter of the housing is subjected to a torsional torque, the outer perimeter of the housing will dislocate in relation to the inner part. When measuring the dislocation, it is possible to determine the torque subjected to the perimeter of the housing.

Moreover, the joint assembly may comprise a planetary gear arranged between the rotor shaft and the wave generator.

In this way, it is achieved that the stator and rotor magnet may be smaller while providing the same output power, even at a higher speed. Furthermore, using a planetary gear allows for the inertia that the wave generator reflects on the rotor shaft to be reduced.

In another embodiment, the joint assembly may comprise an air-filled skin. The air-filled skin may be a polymer comprising air-filled cavities, e.g. a foam. The cavities may be pneumatically connected. The outer surface of the skin may be substantially sealed and impermeable to air. The skin may be a pressure-sensitive skin. In this way, it is possible to monitor whether the robotic arm is in contact with an object. The monitoring is carried out by measuring the pressure in the polymer. In this way, a collision detector is provided, monitoring the pressure in the air-filled skin of the arm or joint.

In an embodiment, the joint assembly may comprise a pole ring and a sensor forming a sensor or sensor unit.

Furthermore, the pole ring may comprise 10-500, or 20-400 or 30-300 poles on a 50 mm pole ring.

Also, the rotor brake may be spring-loaded.

In addition, a brake spring may be made from a non-ferromagnetic material.

In a further embodiment the joint assembly may comprise a first set of pole ring and sensor divided into three sections of 120° and a second or further set of pole ring and sensor that comprises more than 10 poles. In this way, it is possible to get two readings and have the number of poles smaller but still get a high resolution when the readings from the two sets are compared.

In a further embodiment the joint assembly may comprise three sets of sensors and pole rings. The three sets may be a first set of pole ring and sensor divided into three sections of 120° and a second or further set of pole ring and sensor that comprises more than 10 poles and finally a third set either doubling one of the first two or an additional reading. In this way it is possible to get two readings and have the number of poles smaller on each pole ring but still get a high resolution when the readings from all three sets are compared.

The present invention also relates to a robotic arm comprising a joint assembly according to the present invention.

Also, the present invention relates to use of a joint assembly according to the present invention for performing rotational movements of a robotic arm.

Finally, the present invention relates to a method of determining a position of the output part using two sets of pole ring and sensor, wherein the one set of pole ring and sensor is divided into three sections of 120° and the other set comprises more than 10 poles.

BRIEF DESCRIPTION OF THE DRAWINGS

The invention and its many advantages will be described in more detail below with reference to the accompanying schematic drawings, which for the purpose of illustration show some non-limiting embodiments and in which FIG. 6A shows a cross-sectional view of a further embodiment of the output brake, FIG. 6B shows a cross-sectional view of the embodiment of the output brake shown in FIG. 6A.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
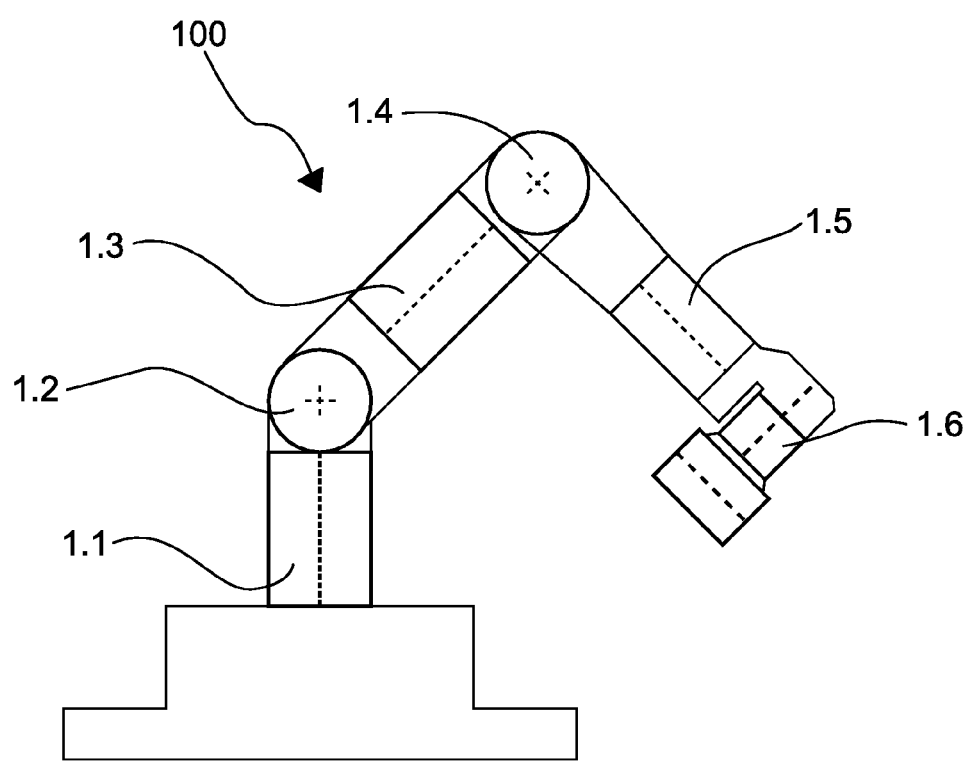
FIG. 1 shows a schematic view of an arm comprising a number of joint assemblies.

FIG. 1 shows a robotic arm having a number of joint assemblies 1. The joint assemblies 1.1, 1.3 and 1.5 are typically called rotational joints, and 1.2, 1.4 and 1.6 are typically called bending joints. However, despite their different orientations, the joint assemblies 1 generally have the same design. It will be understood that in particular, the joints may be longer in order to achieve a desired range for the entire arm 100. In the following, the term "output parts" refers to the parts that cannot rotate significantly relative to the gear box output, e.g. any component on FIG. 3 connected to output part 8. The term "house" refers to anything that cannot rotate significantly relative to the gear box housing, for instance any component on FIG. 3 connected to a housing 26. The term "rotor" refers to parts that cannot rotate significantly relative to the gear box input, for instance any component on FIG. 5 connected to rotor shaft.

Figure 2A:
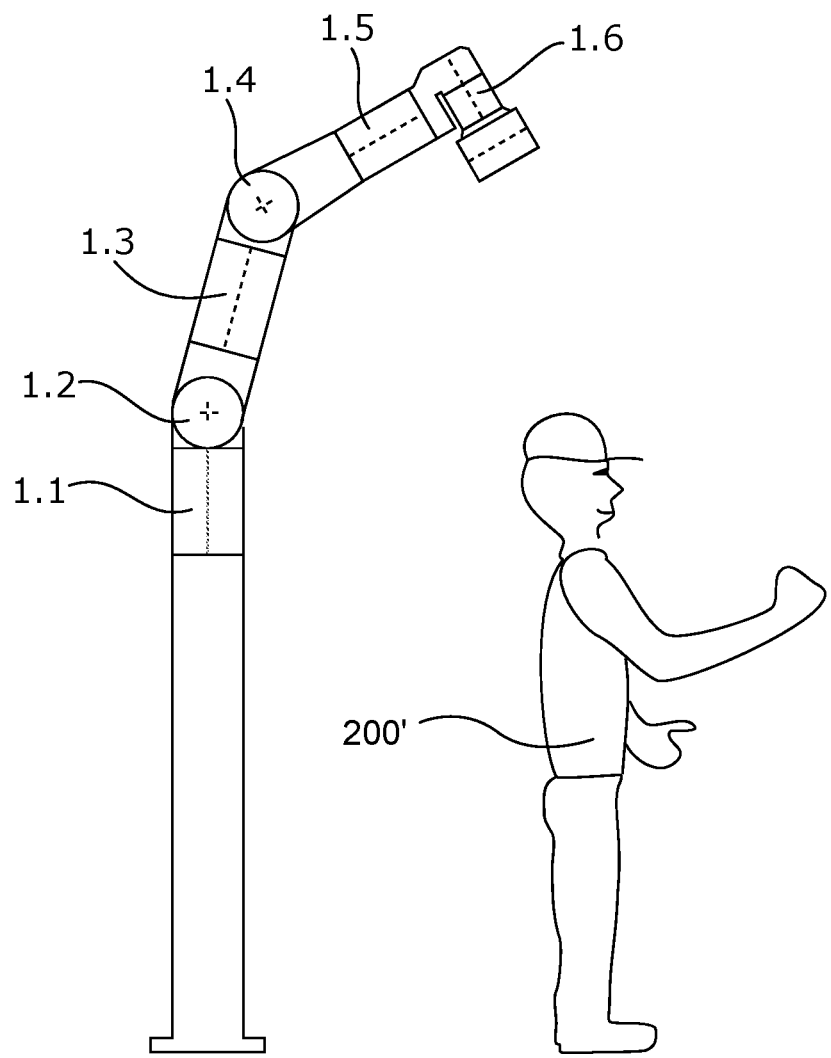
FIGS. 2A and 2B show schematic views of an arm comprising a number of joint assemblies.
Figure 2B:
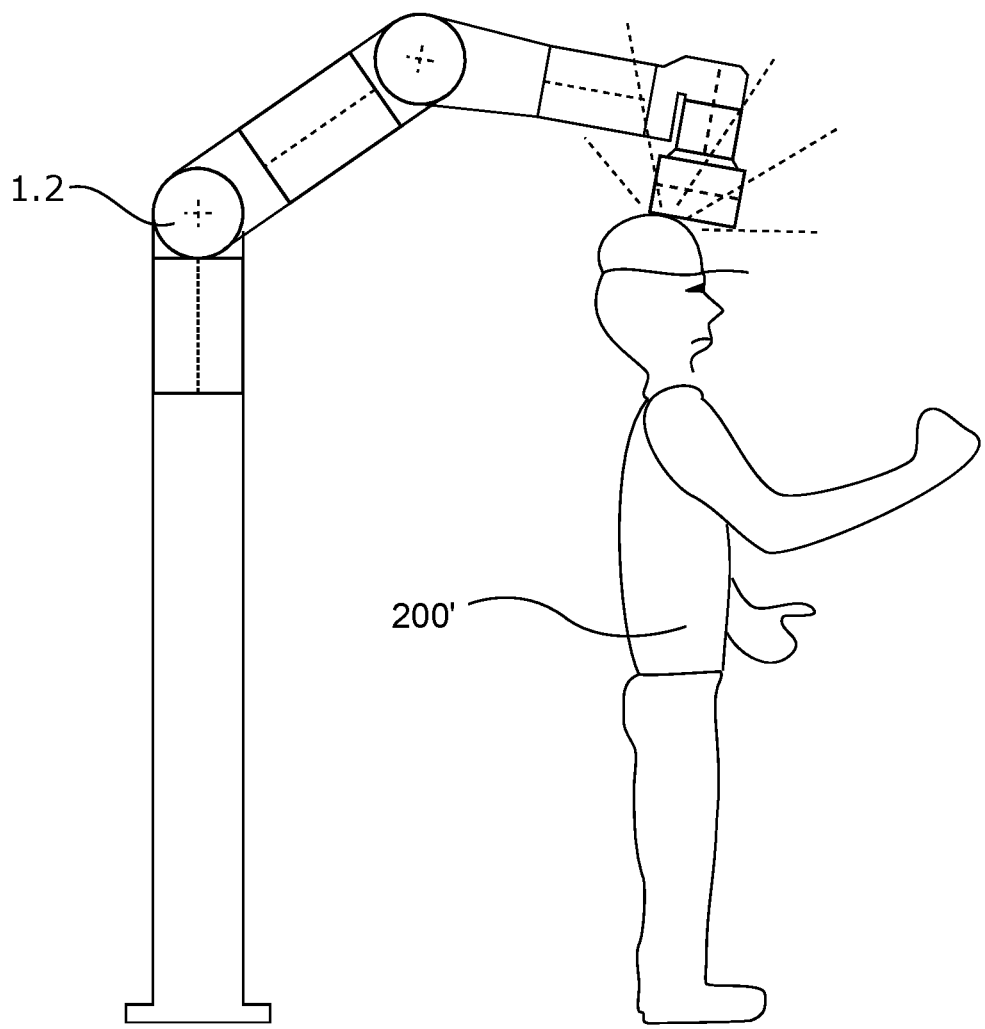

FIGS. 1, 2A and 2B show a robotic arm 100 in a first position in which all of the joints assemblies 1.1-1.6 are in a fully functional state. FIG. 2B shows the same arm 100 in which the joint 1.2 is broken. Hence, the arm 100 rotates freely in the joint 1.2, i.e. joint 1.1 and 1.3 rotate freely in relation to each other. The robotic arm 100 is shown without a load, and therefore, it is only the weight of the arm 100 from the joint assembly 1.2 to the extremity of the arm 100 that causes it to drop. However, considering larger robotic arms, this may be a significant load capable of seriously injuring, and even kill, a person 200' standing under the tip of the arm and hence being exposed to the risk of getting hit by the arm.

Figure 3:
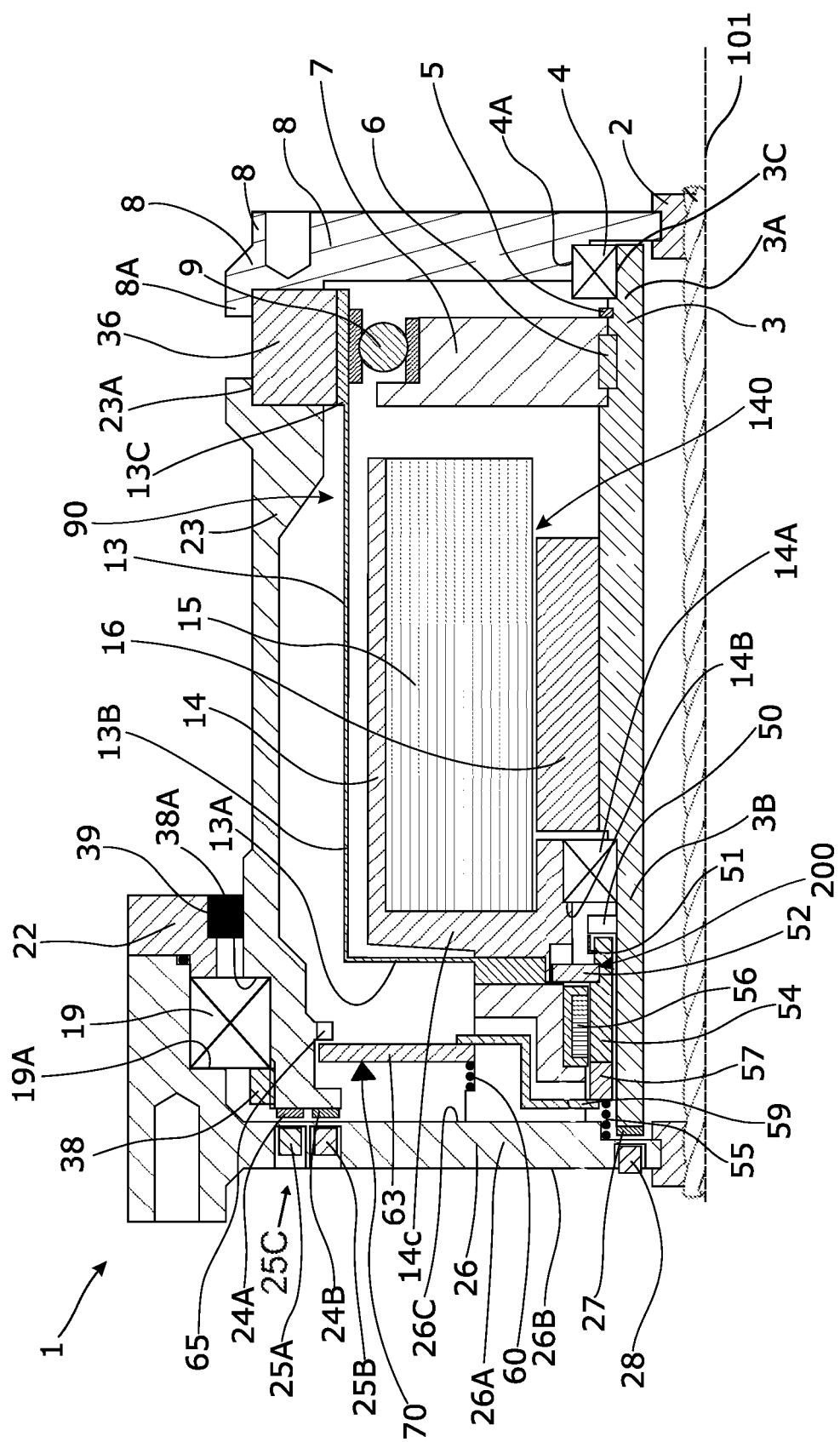
FIG. 3 shows a cross-sectional view of a joint assembly.

FIG. 3 shows half of a cross-sectional view of a joint assembly 1. The cross-sectional view is seen along the longitudinal axis 101 of the joint assembly 1. The joint assembly is symmetrical along the longitudinal axis 101, and therefore, only half of the cross section is shown.

The housing 26 comprises a housing wall 26A, a first housing side 26B and an opposing second housing side 26C. A substantially tubular output house 23 is connected to the housing 26 via a main bearing 19. The bearing 19 is kept in place by a shoulder/projection 19A and a detachable bearing flange 22. A main seal 39 is located between the output house 23 and the bearing flange 22 in order to seal the joint assembly from dirt and moist from the surrounding environment. The main bearing 19 is kept in position on the output house 23 by a nut ring 38 and an output shoulder/projection 38A. The output house 23 is connected to an output part 8 via a ring gear 36. The ring gear is also called a circular spline 36. The ring gear 36 is kept in position by an output house flange 23A and an output part flange 8A. In this embodiment, the output part 8 is a substantially disc-shaped part. The output part 8 comprises connection means for attaching it to e.g. a further joint assembly or a tool (not shown). Similarly, the housing 26 comprises means for attaching it to a further joint assembly or a fixed part (not shown). It is seen that the housing 26, the output house 23 and the output part 8 define a substantially tubular space closed in both ends. Holes are arranged through the centre of the housing 26 and the output part 8 in order that power and communication cables can be supplied to successive joint assemblies in either direction (not shown). The tubular space defined by the housing 26, the output house 23 and the output part 8 is substantially delimited by a rotor shaft 3. The rotor shaft comprises a first end part 3A and a second end part 3B. The rotor shaft supports the output part 8 via a rotor ball bearing 4. The rotor ball bearing is kept in position by a shoulder/projection 4A in the output part 8 and a radially recessed area 3C of the rotor shaft 3 forming a shoulder/projection in the rotor shaft 3.

At the first end part 3A of the rotor shaft 3, a wave generator 7 is arranged. The wave generator 7 is connected to the rotor shaft 3. In this embodiment, the connection is carried out by a retaining ring 5 and a key 6. However, various ways of connecting the wave generator 7 are possible, e.g. the wave generator may be connected by means of welding, gluing or press fittings. The wave generator 7 is in contact with the flexspline 13 via the wave generator bearing 9. The wave generator 7, the flexspline 13 and the circular spline/ring gear 36 together form a strain wave gearing system. However, various terms may be used to refer to such a gearing system. The flexspline 13 may comprise a base flexspline part 13A, a cup wall part 13B and a toothed wall part 13C. The toothed wall part 13C is partly in contact with the circular spline/ring gear 36. During rotation of the wave generator 7, the toothed part 13C of the flexspline 13 is caused to move relative to the circular spline/ring gear 36. The wave generator 7 is rotated by the rotor shaft 3. The rotor shaft 3 is driven by an electric motor 140, the electric motor 140 comprising a stator 15 and a rotor magnet 16, the rotor magnet 16 being affixed to the rotor shaft 3, and the stator 15 and the rotor magnet 16 being arranged inside the flexspline 13. Hence the motor 140 is arranged radially inside the cup wall 13B of the flexspline 13. The motor 140 is arranged inside a motor housing 14 to which the stator 15 is affixed. The motor housing 14 comprises a motor housing base part 14C that is connected to the base flexspline part 13A. Hence, the motor housing 14 and the flexspline 13 rotate along with each other. The motor housing 14, and hence the stator 15, are kept in position in relation to the rotor shaft 3 by a motor bearing 14A. The motor bearing 14A is arranged at the second rotor shaft end part 3B and kept in position by a shoulder/projection 3D in the rotor shaft 3 and a shoulder 14B in the motor housing 14.

The second rotor end part 3B of the rotor shaft 3 comprises a rotor brake stud 50. The rotor brake stud 50 is configured to enter into locking engagement with a ferromagnetic brake ring 54. The ferromagnetic brake ring 54 is arranged inside the anti-rotation ring 52. The ferromagnetic brake ring 54 and the rotation ring 52 are configured to be pushed along the longitudinal axis 101 relative to both the rotor shaft 3 and the motor housing 14 and hence the flexspline 13. The relative movement of the ferromagnetic brake ring 54 is carried out by a spring 55. The ferromagnetic brake ring 54 is kept in a non-engaged position by an electromagnet 57. When power is supplied to the electromagnet 57, the ferromagnetic brake ring 54 is kept in a non-engaged position, i.e. in a non-braked position. In the event that the power is lost, the electromagnet 57 loses its power to hold the ferromagnetic brake ring 54. Hence, the spring 55 will push the ferromagnetic brake ring 54 towards the first rotor end part 3A of the rotor shaft 3. The timing ring 51 serves to mechanically locate the ideal position for the ferromagnetic brake ring 54 to engage the brake stud 50, i.e. to ensure the fastest and most reliable braking. When the brake ring is fully engaged with the brake stud 50, the rotor shaft 3, the motor housing 14, and hence the flexspline 13, cannot move in relation to each other. In this way, the gear moving the output part 8 in relation to the housing 26 is blocked from moving, and hence, the joint assembly is fully braked. In this embodiment, the ferromagnetic brake ring 54 and the spring 55 are separated by a non-ferromagnetic pusher 56. The process of engaging the rotor brake is explained in further detail in FIGS. 4A-4H. In the present embodiment, the activation of the rotor brake also activates an output brake system 70. The output brake/output brake system 70 comprises a brake plate 63 and a second spring 60 arranged to push the brake plate 63 into locking engagement with the toothed brake ring 65 of the output house 23. The output brake 70 is activated similarly to the activation of the rotor brake, and due to an activation cup/pin 59, the brake plate 63 can move along the longitudinal axis 101 of the joint assembly. The brake plate 63 is pushed along the longitudinal axis 101 by the second spring 60.

It is seen from FIG. 3 that in case the flexspline 13 of the strain wave gearing system 90 is broken, e.g. if the cup 13B is fully broken, the output house 23, the circular spline and the output part 8 may rotate freely since the connection between the shaft 3 and the housing 26. This is due to the nature of the construction of the wave gearing that the contact between the output parts and the motor is created via the flexspline 13, in particular the cup 13B. However, in such situation, the output brake will be activated immediately in order to avoid hazardous situations as mentioned above (see FIG. 2B).

It is shown that the housing 26 comprises a rotor rotation sensor 27, 28. The sensor comprises a rotating part 27 and a sensing part 28. Furthermore, the joint assembly comprises a first rotation sensor 24A, 25A and a second rotation sensor 24B and 25B for measuring the rotation of the output part 8 in relation to the housing 26. The sensor parts 24A and 24B are rotating sensor parts. The sensors parts 25A and 25B are the actual sensing parts, i.e. the stationary part. The housing 26 may comprise a number of blind holes 25C.

The flexspline 13, being made of a ferromagnetic steel, shields the magnetic field of the motor 140 so it does not disturb the sensors 25A, 25B, 28 on the nearby electronics. Since the flexspline 13 is allowed to be quite long because it envelopes the motor 140, it also allows the flexspline 13 to be a bit thicker than usual while still retaining the same flexibility to ovalisation near the wave generator 7.

This design of the joint assembly allows the sensors 25A, 25B and 28, e.g. the magnetic field sensors, and the pole rings 24A, 24B and 27 and/or the rotor magnet 16, to be placed hermetically sealed from each other without requiring the use of dynamic seals to separate the greased gear and motor compartment from the clean sensing element compartment. In this way, it is achieved to provide a rotor and joint output angular position sensing system without the use of fast-rotating seals. In particular, it is advantageous that no dynamic seal on the rotor shaft is required. The rotor shaft 3 rotates at high speed, and such dynamic seal generates a significant amount of heat. The joint assembly presented only requires one dynamic seal 39. If wires are to be located through the centre of the joint, two additional rubber grummets/static seals 2 are required in order to separate gearbox/motor compartment and sensing element/surroundings compartment, while still allowing both the measurement of "joint rotor" and "joint output" positions.

In a robotic joint, it is desirable to know both the absolute angular position of the "joint output" and the "joint rotor" relative to the "joint house". Conventionally, these absolute positions can be acquired using two absolute encoders, one on the "joint rotor" and one on the "joint output". A position sensor, which is popular due to its low cost, its ability to work in a greasy/dirty environment and its provision of a high resolution and the possibility of using it in a "hollow shaft design", consists of a magnetic field sensor and a pole ring. A pole ring is a ring magnetised to have multiple magnetic poles along its circumference, the pole spacing typically being between 0.5 mm and 5 mm, which results in between 300 and 30 poles on the circumference of a 50 mm diameter pole ring. The cross section of a typical pole ring is 2 mm times 2 mm. The magnetic field sensor might output several within-one-pole-pair absolute positions within one pole pair. This invention acquires the absolute position of both "joint output" and "joint rotor" using an absolute encoder (for instance consisting of the two magnetic field sensors 24A and 24B and two pole rings 25A and 25B seen in FIG. 3 and FIG. 9 on the "joint output" and an incremental encoder, consisting of one magnetic field sensor 28 and one pole ring 27 or rotor magnet 16, on the "joint rotor"). The invention renders the use of an absolute encoder on the "joint rotor" obsolete by utilising knowledge of the absolute position of the "joint output" and the gear ratio between "joint output" and "joint rotor" to calculate the position of the "joint rotor" with an accuracy better than +/−0.5 rotor pole ring pair. It then uses the absolute output of the magnetic field sensor near the rotor to find the absolute position within this pole pair. In this way, the absolute positions for both "joint output" and "joint rotor" have been found utilising one to two magnetic field sensors and pole rings less than what is normally required. This depends on whether the rotor magnet 16 itself is used as pole ring. It will be understood by the person skilled in the art that pole ring(s) can be replaced by a ferromagnetic tooth structure if instead the sensor side has a magnet, the magnetic field of which near the magnetic field sensor varies with tooth position. The sensor may also be a magnet inducing device, e.g. a solenoid inducing a varying magnetic field in a ferromagnetic structure. Furthermore, the sensor may be an electrically conducting tooth structure.

Figure 4A:
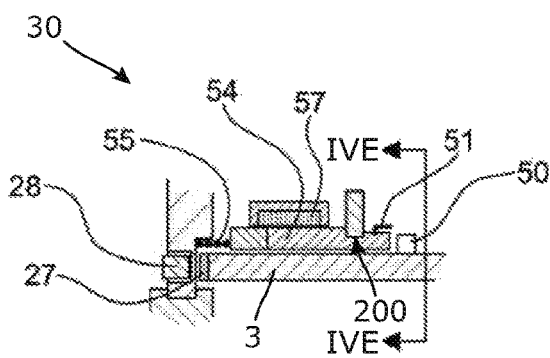
FIGS. 4A-4D show the engagement of a timing ring of the rotor brake.
Figure 4E:
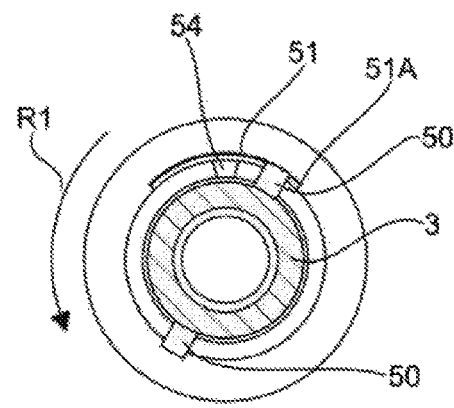
FIGS. 4E-4H show a view changed by 90° in relation to FIGS. 4A-4D, hence showing the rotor brake and its engagement into braked position.
Figure 4B:
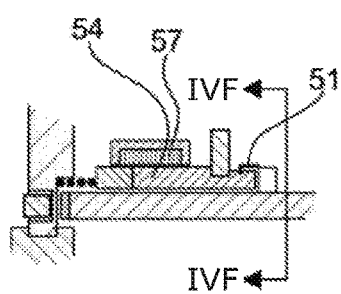
Figure 4F:
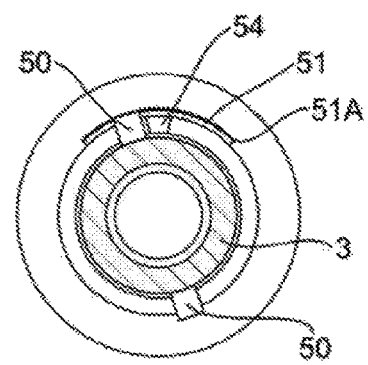
Figure 4C:
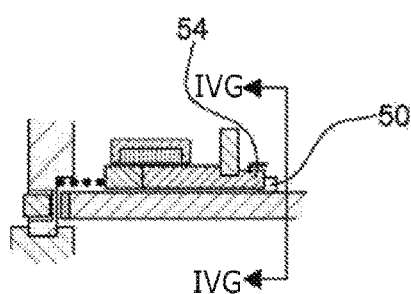
Figure 4G:
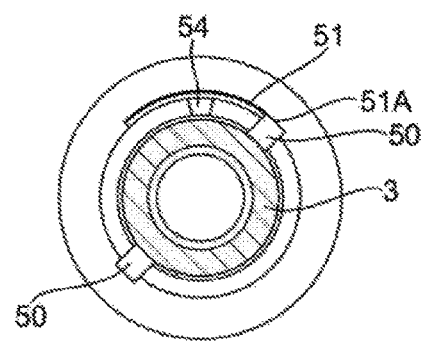

FIGS. 4A-4D show the rotor brake 30 consisting of the elements (50-58). Since FIGS. 4A-4H show the rotor brake in different views and positions reference numerals is to be found on at least one of the FIGS. The rotor brake 30 is activated and engaged when the power in the electromagnet 57 is cut or lost. When the power is lost, the spring 55 pushes the ferromagnetic brake ring 54 into engagement with the rotor brake stud 50. The friction coupling between the anti-rotation ring 52 and ferromagnetic brake ring 54 allows the brake, in a controlled manner, to reduce the speed of the rotor (eventually stop). Hence this friction coupling is arranged as a friction clutch or friction brake 200. The timing ring 51 ensures that the activation of the brake only takes place when the ferromagnetic brake ring 54 can engage fully with the rotor brake stud 50, i.e. that the spring 55 pushes the brake. FIG. 4H is a turned view of FIG. 4A and shows the rotor shaft 3 rotating along the arrow R1. The position of the rotor brake stud 50 is in a position in which full engagement is not possible due to the rotation along R1. If the brake ring 54 in this position were projected by the spring 55, the brake ring 54 would not reach its fully projected position, and will hence not establish full engagement between the brake stud 50 and the brake ring 54. Hence, the timing ring 51 ensures that the brake ring 54 is only pushed forward by the spring until the timing ring 51 meets the brake stud 50. FIG. 4B and FIG. 4F show the brake stud 50 pushed forward and sliding on the edge of the timing ring 51. When the brake stud 50 is sliding on the edge of the timing ring 51, the brake ring 54 is prevented from being projected fully by the spring 55. However, when the rotor shaft 3 continues to turn, the brake stud 50 will pass the timing ring, and hence it will be possible for the brake ring 54 to project fully (see FIG. 4C and FIG. 4G). The rotor shaft 3 continues to turn, but hitting the timing ring on the short edge 51A will cause the timing ring 51 to bend radially outwards and hence allow the brake stud 50 to rotate further until it is finally stopped by the brake ring 54. In this embodiment, the brake ring 54 comprises a projection. The brake ring 54 may also comprise an indent or slot for engagement with the rotor brake stud 50.

Figure 4D:
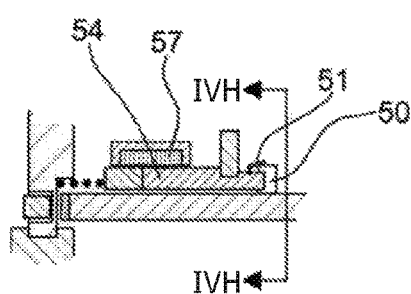
Figure 4H:
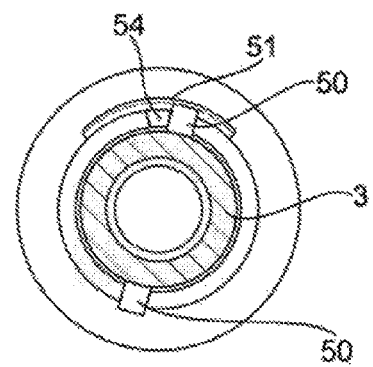

FIG. 4D and FIG. 4H show that the brake ring 54 and the brake stud 50 are fully engaged. The timing ring 51 is bent radially outwards and hence allows the brake ring 54 to be in its fully projected position.

In FIG. 4A-4H, it is to be understood that rather than having the spring 55 acting on the non-ferromagnetic pusher 56, two or more springs can act on the anti-rotation ring 52. The timing ring 51 allows only the ferromagnetic brake ring 54 to move into engagement with the rotor brake stud 50 at more limited angular intervals than the ferromagnetic brake ring 54 allows. In this way, it is allowed to start engagement when the brake ring has an angular distance to the rotor brake stud 50 which is adequate for ensuring full engagement between the rotor brake stud 50 and the brake ring ferromagnetic brake ring 54. The timing ring 51 is bent radially outwards, i.e. away from the rotor brake stud 50, as it collides with it. The timing ring 51 is adapted to ensure full engagement, but the rotor brake 30 will function without the timing ring 51. Instead of a timing ring 51, another embodiment of the rotor brake 30 may comprise a member connected to the ferromagnetic brake ring 54 comprising a torsional spring. Upon activation of the rotor brake, the torsional spring moves the member towards the rotor brake stud 50 when forced out of neutral torsional position relative to the ferromagnetic brake ring 54.

FIGS. 4E-4H show the same steps/positions as shown in FIGS. 4A-4D, but in a different view.

Figure 5:
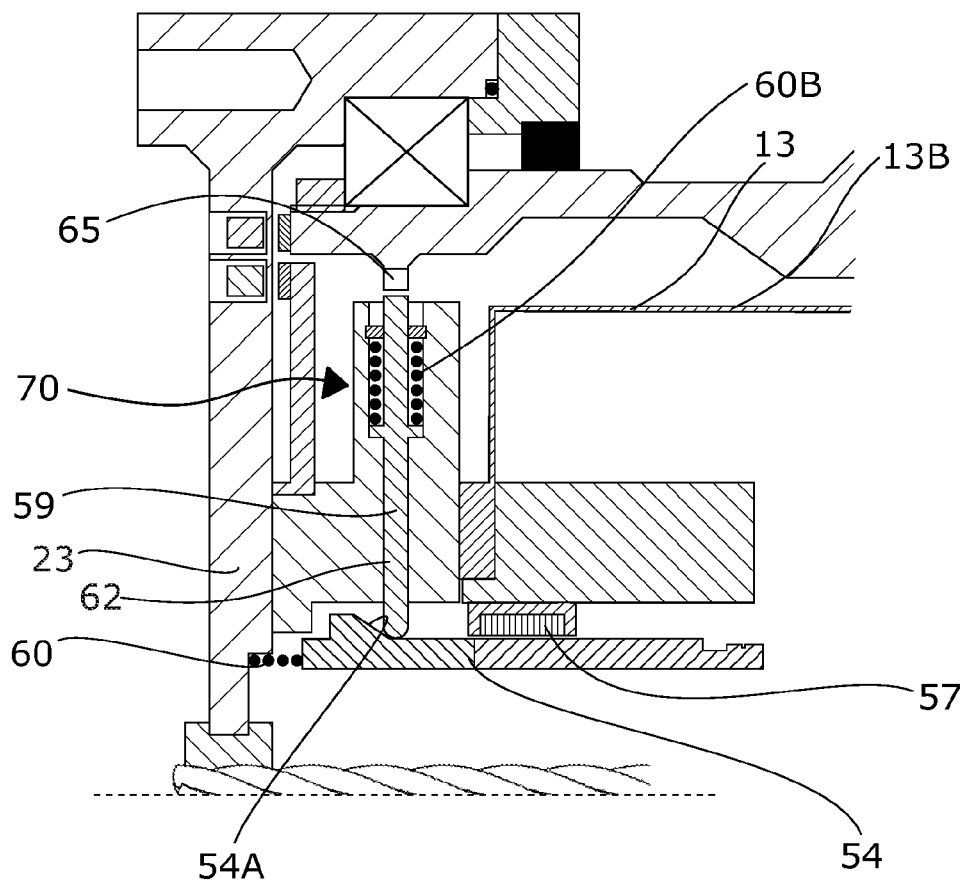
FIG. 5 shows a cross-sectional view of an embodiment of the output brake having a spring-loaded activation pin.

FIG. 5 and FIGS. 6A and 6B show two embodiments of an output brake 70. FIG. 5 shows the output brake 70 in a disengaged position. A sensitive element used in most lightweight robots is the flexspline 13, due to the wave gear's superior strength to weight ratio. This component, which is shaped like a cup, must be thin in order to be flexible enough to work as intended in the gearbox, and one of its failure modes is that it is completely torn apart, allowing the output to rotate completely freely. In lightweight robots intended for collaborative work with humans, the combination of a brake working on the input side of the gearbox and a gearbox failure mode completely eliminating any connection between input and output is a safety risk. If a robotic arm carried 10 kilograms a height of 1 metre above the head of a human worker, and a primary joint gearbox broke, the load could be dropped on the head of the human worker, possibly resulting in death. Therefore, a brake that is still based on inexpensive components, but which acts on the output side of the gearbox, is presented. FIG. 5 shows an embodiment of the output brake comprising a toothed brake ring 65 which, and when an electromagnet 57 is released, the output brake is forced by a spring 60 into engagement with a toothed part of the activation pin 59. The toothed brake ring 65 is rotationally constrained to only allow a small amount of rotation relative to the output house 23 in order for the brake not to brake too abruptly. It is shown that the brake ring 54 comprises an inclined area 54A. The inclined area 54A may be arranged in a section of the brake ring 54 that is non-ferromagnetic. When the electromagnet 57 releases its fixation of the brake ring 54, the spring 60 will push the brake ring 54, and hence the slanted area 54A will push the activation pin 59 radially outwards and cause the activation pin 59 to engage the toothed brake ring 65. A spring 60B ensures that the activation pin 59 is kept in its disengaged position until the slanted area 54A of the brake ring 54 pushes the activation pin radially outwards.

In the embodiment shown in FIGS. 6A and 6B, the inclining area 54A of the ferromagnetic brake ring 54 is pushing the activation pin 59 upwards in the picture, i.e. radially outwards, when the electromagnet 57 is energised (or power is lost). If the output brake is heavily loaded, i.e. a heavy load is carried by the joint assembly, the brake pin 62 cannot move and hence the brake cannot disengage. In this situation, the activation spring 61 will be fully compressed. If the joint motor is activated in order to try to move the joint output house 23 a bit in either direction, the activation spring 61 will suddenly disengage the activation pin 59 through the brake lever 63, since the activation spring 61 is much stiffer than the return spring 60B in all embodiments of the invention. The brake can be made without the activation spring 61, but this will require the electromagnets 57 to be energised throughout the timespan during which it is attempted to rotate the output in both directions in order to allow the activation pin/brake pin to disengage. It is possible to have several output brakes 70 in one joint assembly. All output brakes may be actuated by the same ferromagnetic brake ring 54. In the embodiment shown in FIG. 5, a brake lever 63 (not shown) and a brake pin 62 (not shown) are joined into one component, the activation pin 59. In the embodiment shown in FIGS. 6A and 6B, the brake force is held by the teeth on the brake pin 62 and a toothed brake disc 65. This embodiment of the output brake 70 needs to be shaped in such way that each brake pin takes up torque in one direction only. In the other embodiment shown in FIG. 5, the activation pin 59 also acts as the brake pin 62, directly engaging the toothed brake disc 65. FIG. 6B is a cross-sectional view of FIG. 6A, it shown that the activation spring 60 near the ferromagnetic brake ring 54 ensures that the activation pin 59 is pushed downwards, i.e. from the top of the ferromagnetic ring 54 and down the sloped section 54A, when the electromagnet 57 (only shown in FIG. 6A) is energised. In yet further embodiments, the friction coupling of the output brakes 70 can be replaced by a toothed flexible member.

Figure 7:
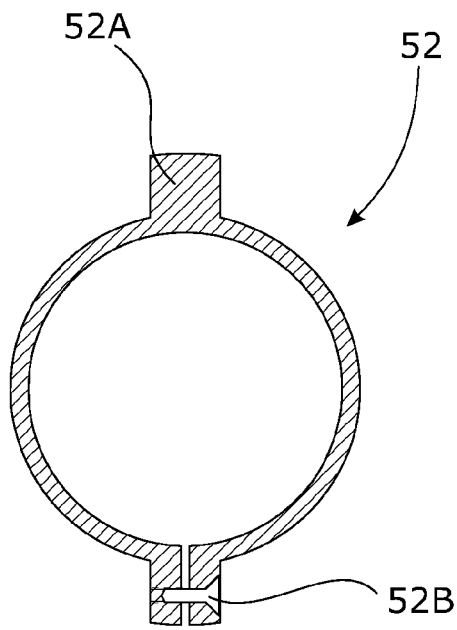
FIG. 7 shows a cross-sectional view of a brake friction ring.

FIG. 7 shows an anti-rotation ring 52. The anti-rotation ring 52 is e.g. shown in FIG. 3 for providing an adjustable slip system for the rotor brake. The ring 52 is tightened to a desired level around e.g. the rotor shaft (not shown). The rotation stud 52A is adapted to ensure full non-slipping engagement with e.g. the motor housing 14 (not shown, see FIG. 3). It is seen that the anti-rotation ring 52 comprises an adjustment system 52B for adjusting the level of rotation, i.e. the slipping during braking.

Figure 8:
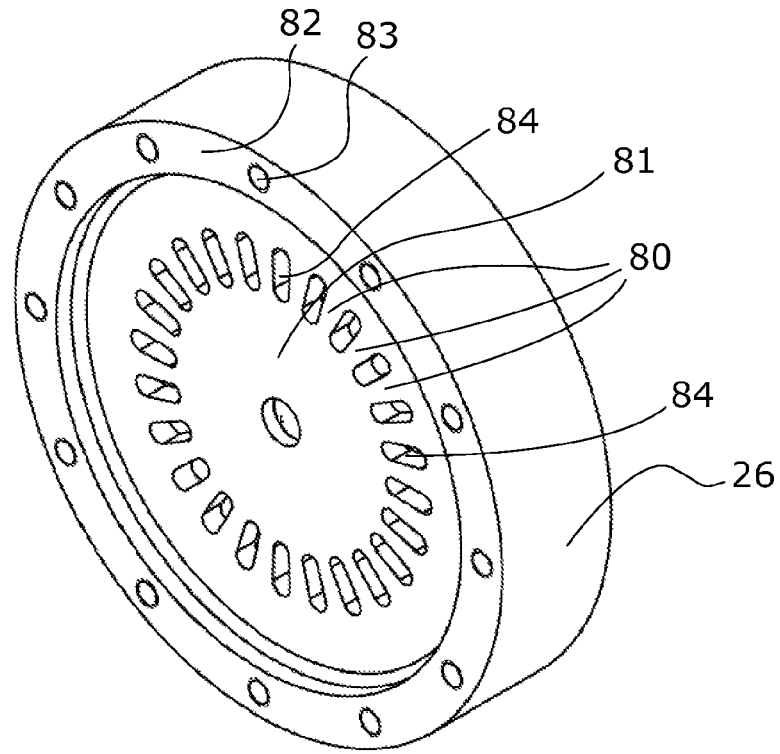
FIG. 8 shows a perspective view of the flexible part of the housing of the joint assembly shown in FIG. 3.

FIG. 8 shows the housing 26 comprising flexible members 80. The flexible members 80 (only three are provided with reference signs) facilitates that the outer perimeter part 82 of the housing 26 may be angularly rotated in relation to the inner part 81 of the housing 26. In this way, it is achieved that the outer perimeter part, due to a torque applied to the housing 26, e.g. by applying a torque to the holes 83, is in fact torsionally rotated in relation to the inner housing part 81. Hence, when a sensor is placed in each end of longitudinal hole 84, the sensors will measure differently, and thereby the torque applied to the housing can be determined (see FIG. 3). Such a system is typically called an absolute encoder and may be used as the "joint output" position sensor, using the 360 Degree Vernier Principle. According to this principle, two or more magnetic pole rings, having a different number of pole pairs, and two or more magnetic field sensors are used to calculate an absolute position from the difference in output between the sensors. In this embodiment, the absolute "joint output" position sensor is also built from pole rings and magnetic field sensors which output several within-one-pole-pair-absolute positions within one pole pair. If the flexible member is significantly less flexible than what corresponds to one pole pair, for instance less than 10% of one pole pair, then the difference between the output of two magnetic field sensors on each side of the flexible member can be used to calculate the torque in the flexible member, given that the torsional stiffness of the flexible member is known. In this way, a combined joint assembly position and torque sensor system is achieved.

Figure 9:
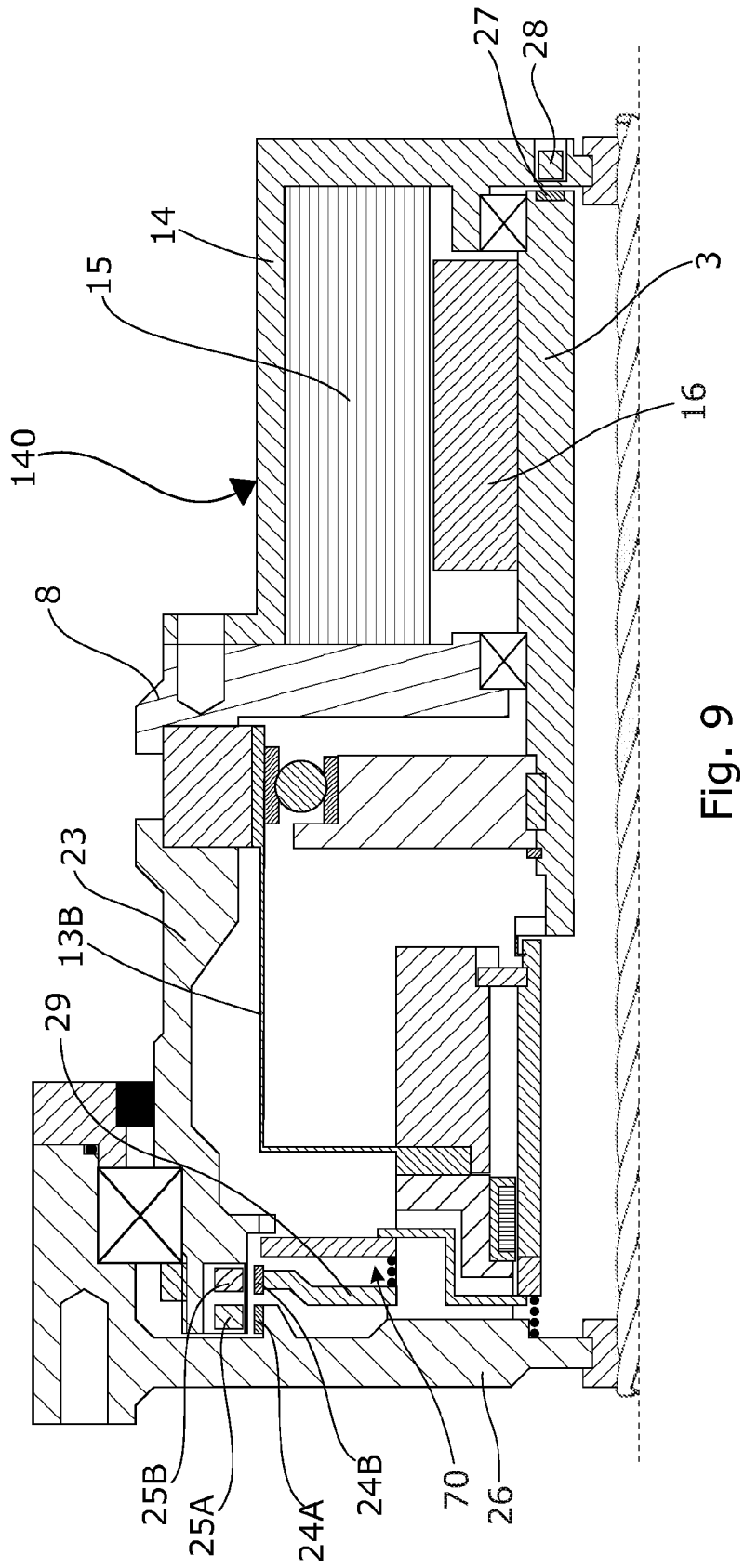
FIG. 9 shows an embodiment of the joint assembly comprising only one dynamic seal.

FIG. 9 shows another embodiment of a joint assembly design where the motor 140 is placed extending from the output part 8. In this embodiment, the motor housing 14 is attached to the output part 8. The stator 15 is affixed to the motor housing 14 and the rotor magnet 16 to the shaft 3. Rotor ball bearings, respectively, support the output part 8 and the motor housing 14 in relation to the shaft 3. Due to this construction of the joint assembly, the sensor part 28 of the rotor rotation sensor can still be arranged outside the space comprising the motor. In this way, the rotor shaft sensor 28 is mounted in the motor housing 14. It is seen that the sensors 24A, 24B, 25A and 25B are positioned outside the dirty area, i.e. under the cup 13B of the flexspline and inside the motor housing 14. Two sensors 25A and 25B are arranged opposite their respective pole rings 24A and 24B. One pole ring 24A (part of the sensor) is mounted on the housing 26. When the housing 26 comprises flexible members 80 (not shown, see FIG. 8), it is obtained that the torque of the housing 26 in relation to the output house 23 or output part 8 can be measured.

Figure 9B:
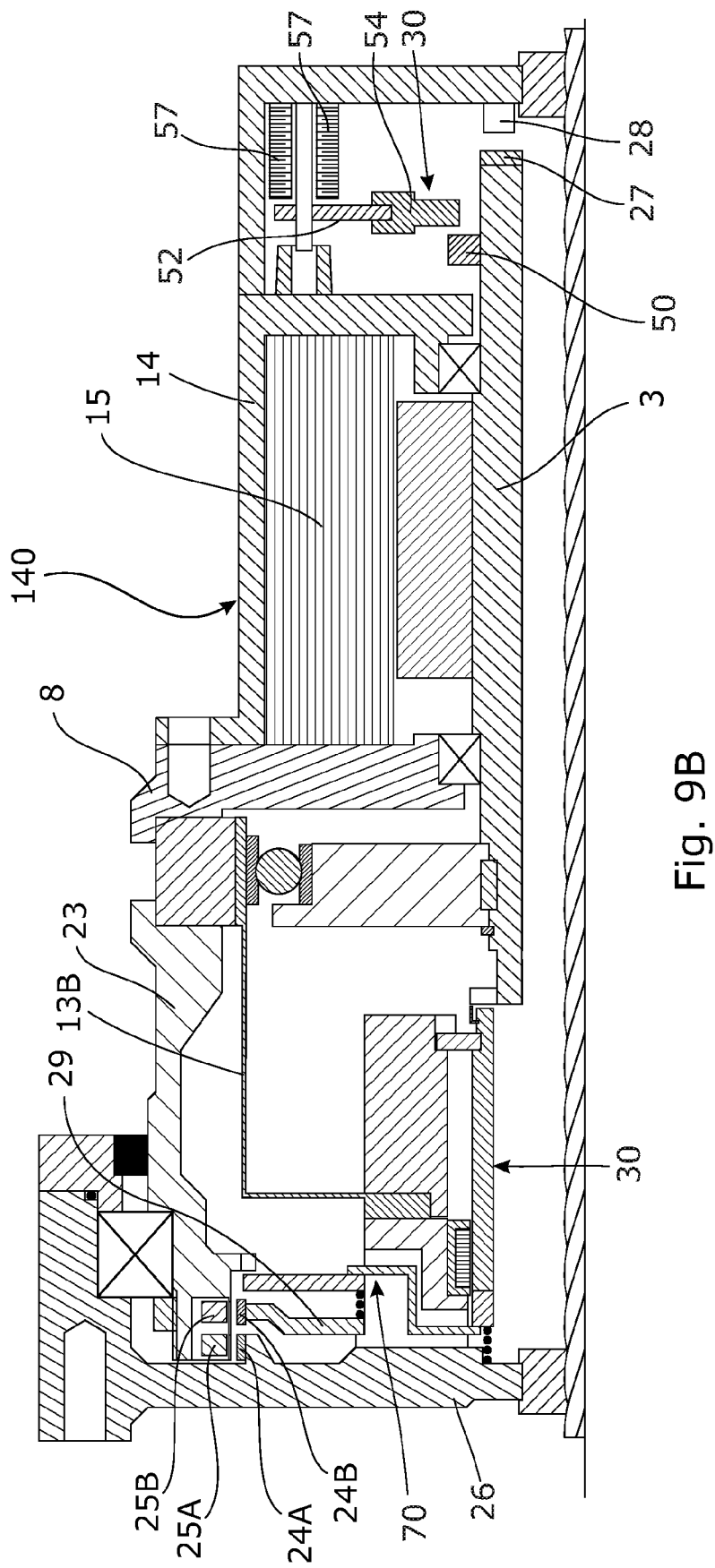
FIG. 9B shows an embodiment where the brake is arranged outside the motor housing.
Figure 9C:
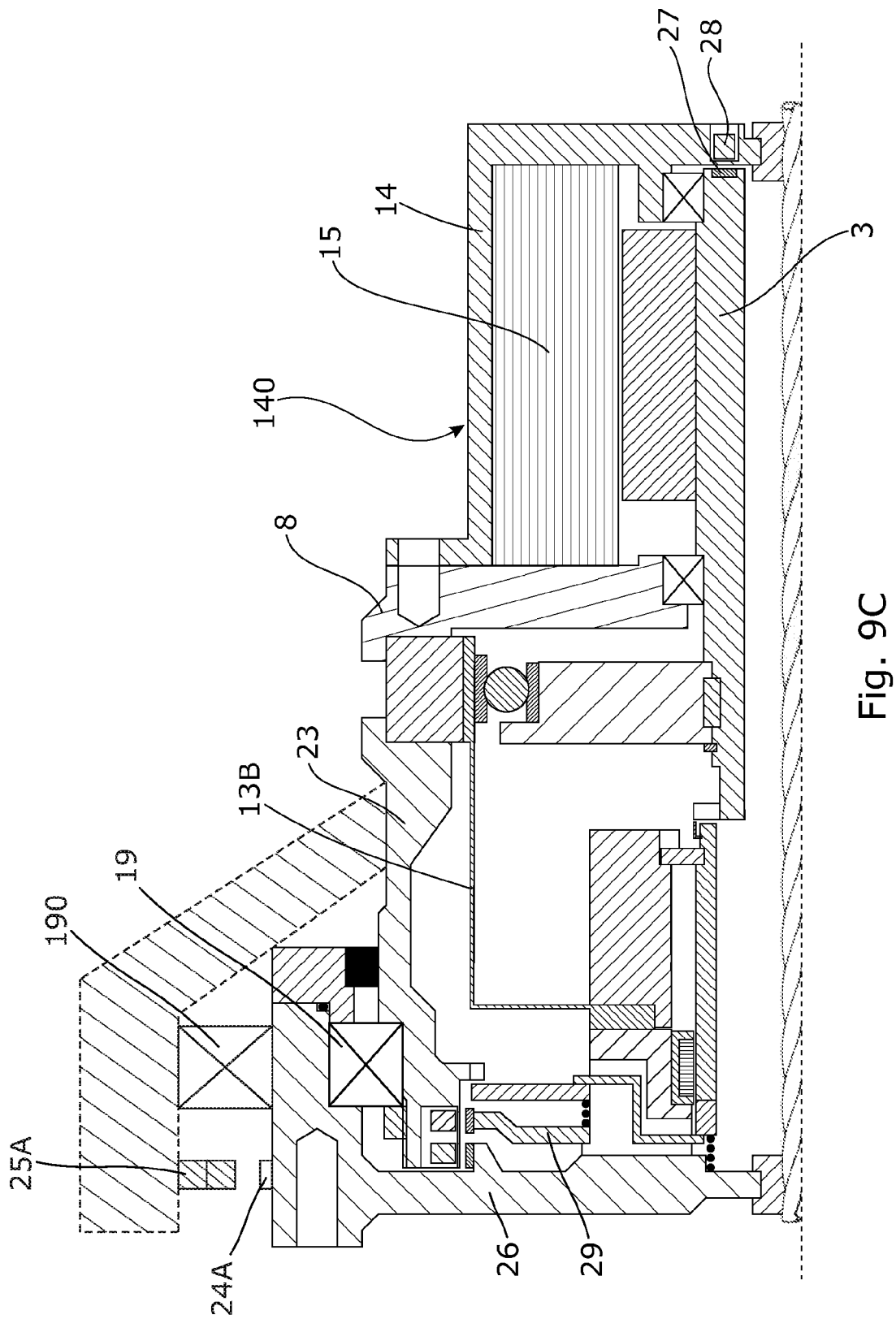
FIG. 9C shows an embodiment where the output house is broadened.

FIGS. 9B and 9C show another embodiment of the joint assembly. In FIG. 9B, the motor 140 is placed extending from the output part 8. In this embodiment, the motor housing 14 is attached to the output part 8. The stator 15 is affixed to the motor housing 14 and the rotor magnet 16 to the shaft 3. Rotor ball bearings support the output part 8 and the motor housing 14 in relation to the shaft 3. Due to this construction of the joint assembly, the sensor part 28 of the rotor rotation sensor can still be arranged outside the space comprising the motor. In this way, the rotor shaft sensor 28 is mounted in the motor housing 14. It is seen that the sensors 24A, 24B, 25A and 25B are positioned outside the dirty area, i.e. under the cup 13B of the flexspline and inside the motor housing 14. Two sensors 25A and 25B are arranged opposite their respective pole rings 24A and 24B. One pole ring 24A is mounted on the housing 26. When the housing 26 comprises flexible members 80 (not shown, see FIG. 8), it is obtained that the torque of the housing 26 in relation to the output house 23 or output part 8 can be measured. FIG. 9B shows the joint assembly comprising an extension to the motor housing 14, in which extension a brake is arranged. FIG. 9B shows this brake as an additional brake compared to FIG. 9, but embodiments having just one brake are equally possible. Hence, the brake arranged substantially inside the flexspline may be omitted when the brake in the extended housing is present. The electromagnets/solenoids 57 keep the brake in a released position, and upon activation, the brake ring 54 will be pushed into engagement with the rotor brake stud 50. The brake ring may be pushed by a spring or similar (not shown). The anti-rotation ring 52 and the brake ring 54 are connected to provide a friction clutch, i.e. they may slide in relation to each other when the force subjected is above a certain threshold value. In this way, the friction clutch functions as a friction brake providing a controlled braking of the parts in relation to each other and thereby reducing the impact on the joint when braking. Similar to the embodiment shown in FIG. 9, FIG. 9B shows an embodiment where that the housing 26 comprises a rotor rotation sensor 27, 28 arranged in the extended motor housing. The sensor comprises a rotating part 27 and a sensing part 28. Furthermore, the joint assembly comprises a first rotation sensor 24A, 25A and a second rotation sensor 24B and 25B for measuring the rotation of the output part 8 in relation to the housing 26. The sensor parts 24A and 24B are rotating sensor parts. The sensors 25A and 25B are the sensing parts, i.e. the stationary parts of the rotation sensor.

FIG. 9C is a highly schematic view from which it is seen that the output house 23 may have an alternative shape marked with dotted lines. In this way, it is achieved that e.g. the measuring of the sensors 24A and 25A are positioned outside, and not under, the cup 13B of the flexspline and inside the motor housing 14. The pole ring 24A is arranged opposite the sensor 25A, and hence, one pole ring 24A is still mounted on the housing 26. In this embodiment where the housing is wider, the bearing 19 is omitted and replaced by the bearing 190 In this embodiment, the output brake may also be arranged near the bearing 190.

The embodiments described in FIGS. 9, 9B and 9C are fully compatible with each other, and hence, further embodiments are considered as well when interchanging the features of the three embodiments, e.g. having the brake arranged in an extension to the motor housing 14.

Figure 10:
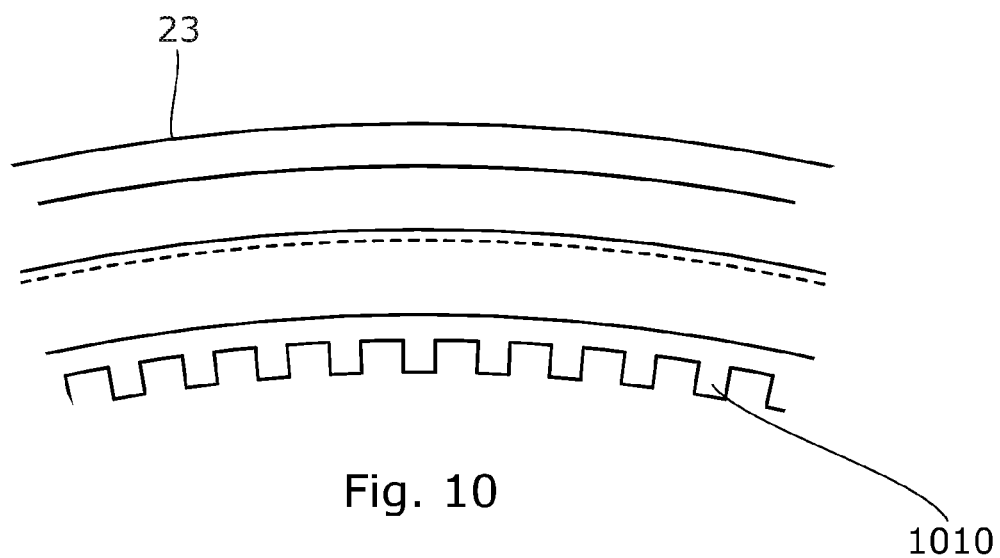
FIG. 10 shows a cross-sectional view of the housing at the output brake.

FIG. 10 shows a cross-sectional view of a cut-out of the output house 23. The teeth 1010 are shown. The teeth 1010 are arranged to provide locking engagement with the output brake 70, e.g. shown in FIG. 3, FIG. 5, FIG. 9 or FIG. 11.

Figure 11:
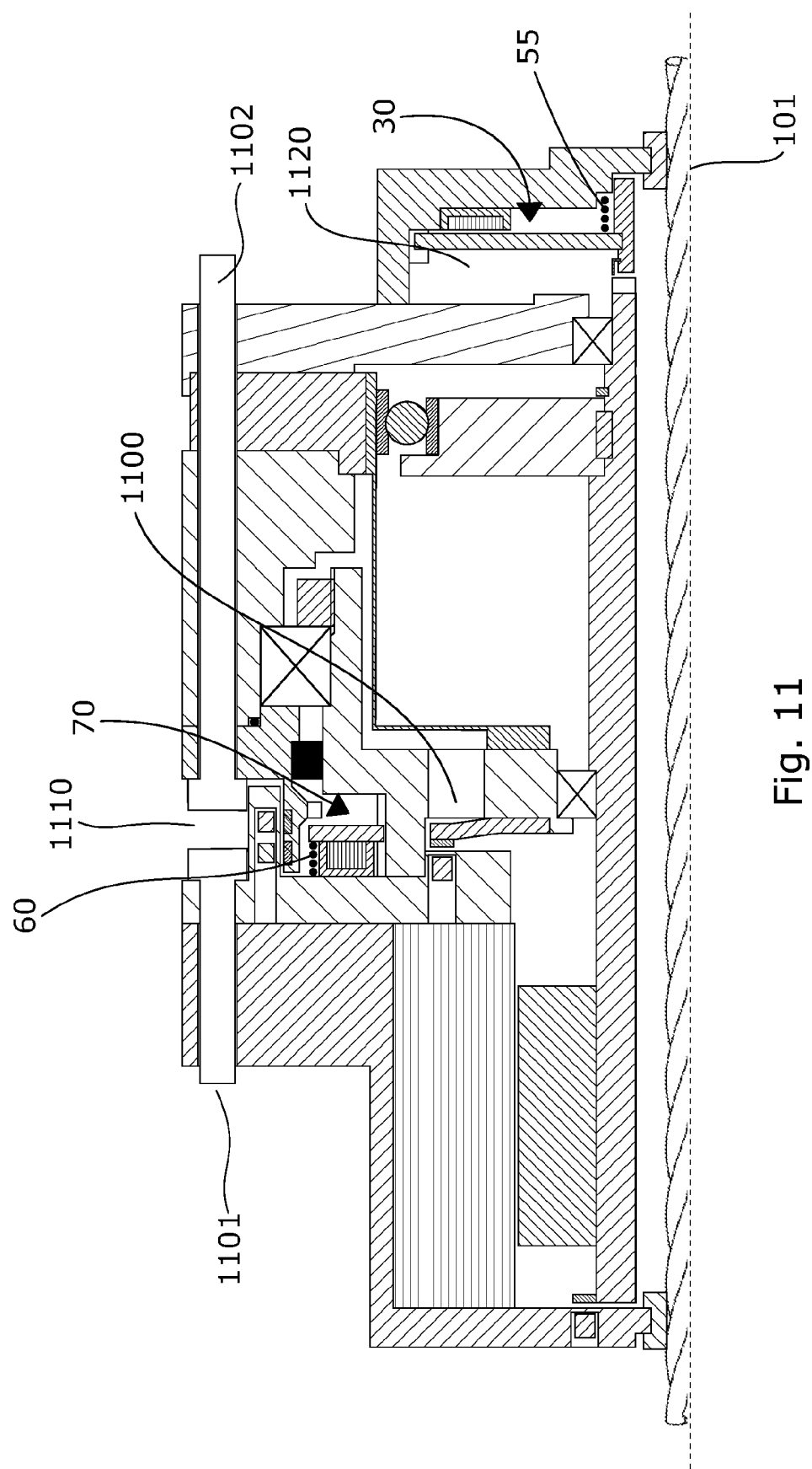
FIG. 11 shows a cross-sectional view of a further embodiment of the joint assembly.

FIG. 11 shows an embodiment of the joint assembly comprising a rotor brake 30 and an output brake 70. Both brake systems 30, 70 are arranged to work in a similar manner as described under FIG. 3 and FIGS. 5-6B. However, the brakes presented in this embodiment have the electromagnets arranged perpendicularly to the longitudinal axis 101, i.e. turned ninety degrees compared to the previous embodiments. Furthermore, the embodiment shown comprises two output brakes. The two brakes are mechanically connected. In this way, safety is further enhanced. The two brakes are activated by two electromagnets and thereby safety is further increased. This is due to the fact that it is unlikely that both of the electromagnets fail. The activation is the same in the sense that upon activation of the brake, the electromagnet is either turned on or power is cut. This causes the spring 55, 60 to push the braking part towards studs or teeth. The bolts 1101, 1102 are arranged in such way that the joint assembly is as compact as possible. The head of the bolts are arranged in a recess 1110 of the assembled joint assembly. The rotor brake 30 is arranged in a compartment 1120 extending away from the output part in the direction away from the flexspline along the longitudinal axis 101.

Figure 12:
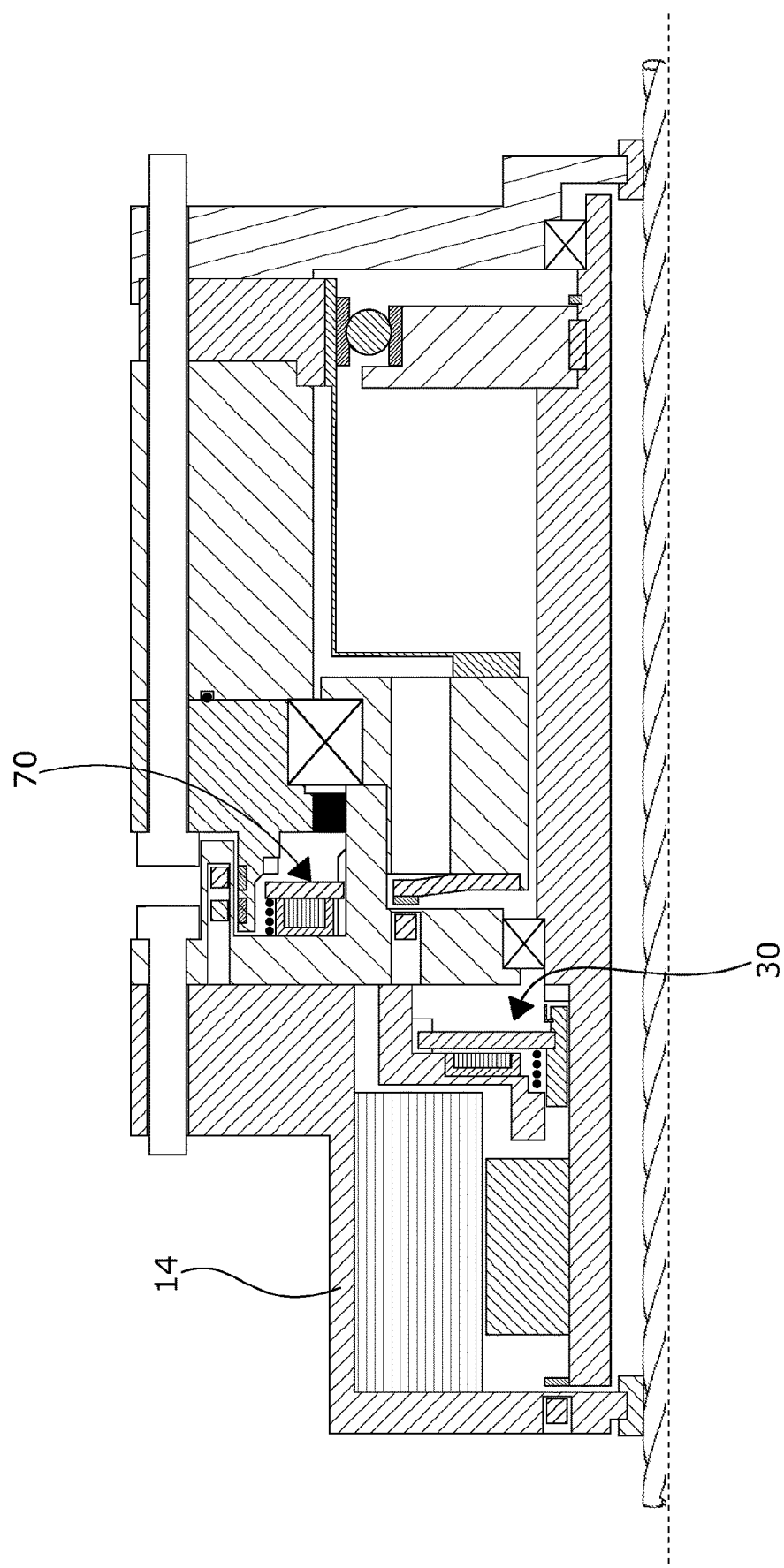
FIG. 12 shows a joint assembly similar to that of FIG. 11 with a further rotor brake construction.

FIG. 12 shows another embodiment of the joint assembly. It is shown that the rotor brake 30 is arranged inside the motor housing 14.

Figure 13:
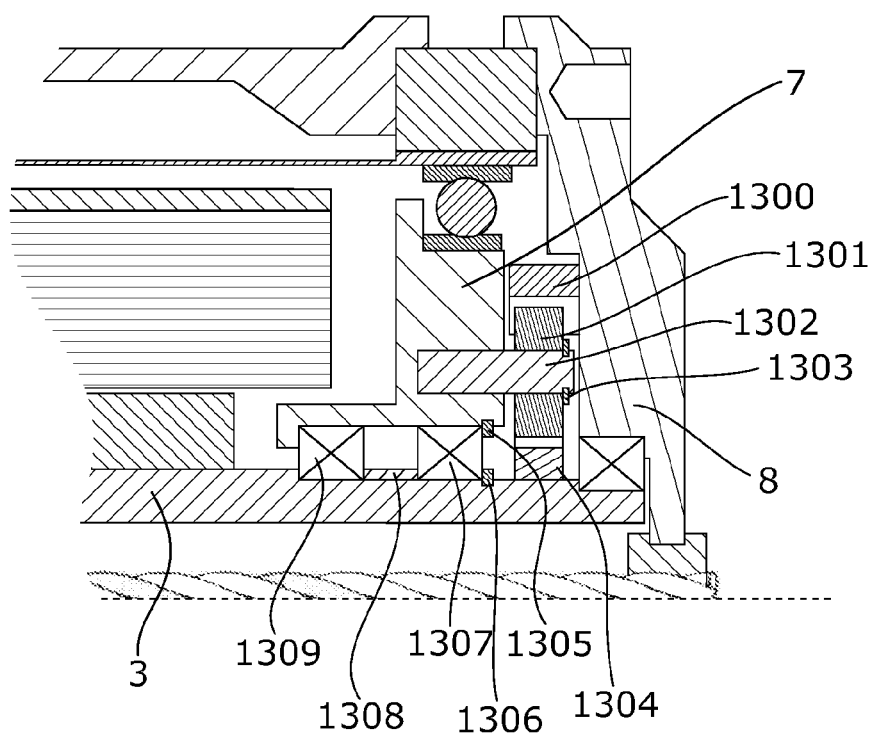
FIG. 13 shows a further embodiment of the wave generator comprising a planetary gear construction.

FIG. 13 shows a particular embodiment of the joint assembly of FIG. 3 comprising a planetary gear. The planetary gear 1300 is arranged between the rotor shaft 3 and the wave generator 7. The planetary gear 1300 may be arranged directly on the wave generator 7 and the shaft 1302 is mounted on the output part 8. Bearing 1309 and bearing 1307 ensure that the wave generator 7 is kept in position. The bearings 1309, 1307 are spaced apart by a distance piece 1308 and kept in position by a shoulder in the wave generator and two keys 1305, 1306. The planetary gear 1300 and the wave generator are connected by a shaft 1302 affixed by a locking ring 1303. The toothed wheel 1301 of the planetary gear 1300 engages the toothed wheel 1304 of the rotor shaft 3.

Although the invention has been described in the above in connection with preferred embodiments of the invention, it will be evident for a person skilled in the art that several modifications are conceivable without departing from the invention as defined by the following claims.

The invention claimed is:

1. A joint assembly for a robot, comprising:
    a housing connected with an output part, the housing comprising a housing wall,
    a strain wave gearing system comprising:
        a wave generator,
        a flexspline, and
        a circular spline connected to the output part;
    a rotor shaft configured to rotate the wave generator;
    an electric motor configured to drive the rotor shaft and comprising a rotor magnet and a stator, the rotor magnet being affixed to the rotor shaft; and
    sensors arranged to, in combination, determine a position of the output part in relation to the housing, each of said sensors having a magnetic field sensor and a pole ring, wherein one of said sensors is a first sensor configured to measure rotation of the output part in relation to the housing, and one of said sensors is a rotor sensor configured to measure rotation of the rotor shaft;
    wherein the pole ring of the first sensor is divided into a number of sections, and wherein a gear ratio of the strain wave gearing system is not divisible to an integer by the number of sections.

2. The joint assembly according to claim 1, wherein the number of sections are of equal size.

3. The joint assembly according to claim 2, wherein the number of sections are three sections of 120° each.

4. The joint assembly according to claim 1, wherein one of the sensors is a second sensor configured to measure rotation of the output part in relation to the housing.

5. The joint assembly according to claim 4, wherein the housing comprises flexible members configured to facilitate an outer perimeter part of the housing angularly rotating in relation to an inner part of the housing.

6. The joint assembly according to claim 5, wherein the first sensor is configured to measure the rotation of the output part in relation to the housing near the outer perimeter part of the housing, and the second sensor is configured to measure the rotation of the output part in relation to the housing near the inner part of the housing.

7. The joint assembly according to claim 5, wherein the housing comprises longitudinal holes, and the first sensor and the second sensor are configured to measure the rotation of the output part in relation to the housing at opposite ends of the longitudinal holes.

8. The joint assembly according to claim 1, wherein at least one of the pole rings comprises between 10 and 400 poles.

9. The joint assembly according to claim 1, wherein at least one of the pole rings comprises between 30 and 300 poles.

10. The joint assembly according to claim 1, wherein at least one of the pole rings comprises between 10 and 500 poles.

11. The joint assembly according to claim 1, wherein at least one of the pole rings is a 50 mm. pole ring.

12. The joint assembly according to claim 1, wherein at least one of the magnetic field sensors is positioned in the housing in a space different from that of the flexspline.

13. The joint assembly according to claim 1, wherein the housing comprises one or more blind holes, and wherein at least one of the magnetic field sensors is positioned in one of said one or more blind holes.

14. The joint assembly according to claim 1, wherein the flexspline is made of a ferromagnetic steel.

15. The joint assembly according to claim 1, wherein the joint assembly comprises a planetary gear arranged between the rotor shaft and the wave generator.

16. The joint assembly according to claim 1 further comprising a rotor brake configured to stop or prevent relative movement between the rotor shaft and the flexspline.

17. The joint assembly according to claim 16, wherein the rotor brake comprises a friction clutch or a friction brake for minimising impact on the joint assembly when the rotor brake brakes.

18. The joint assembly according to claim 16, wherein the rotor brake is spring-loaded.

19. The joint assembly according to claim 16, wherein a brake spring is made from a non-ferromagnetic material.

20. The joint assembly according to claim 1 further comprising an output brake configured to stop or prevent rotation of the output part.

21. The joint assembly according to claim 20, wherein the output brake is configured to stop or prevent rotation of the output part even if the flexspline is broken.

22. A robotic arm comprising the joint assembly according to claim 1.

23. A method for performing rotational movements, the method comprising:
providing the robotic arm of claim 22;
driving the electric motor to rotate the output part; and
measuring the position of the output part in relation to the housing.

24. A joint assembly for a robot, comprising:
a housing connected with an output part, the housing comprising a housing wall;
a strain wave gearing system comprising:
a wave generator,
a flexspline, and
a circular spline connected to the output part,
wherein the wave generator is configured to be rotated by a rotor shaft, the rotor shaft being configured to be driven by an electric motor comprising a rotor magnet and a stator, the rotor magnet being affixed to the rotor shaft, and wherein the joint assembly further comprises:
one or more sensors comprising magnetic field sensors and pole rings arranged to determine a position of the output part in relation to the housing; and
an output brake configured to stop or prevent rotation of the output part even if the flexspline is broken.

* * * * *